July 19, 1932. J. ZEEMAN 1,868,301
INTERNAL COMBUSTION ENGINE
Filed Dec. 17, 1929 2 Sheets-Sheet 1
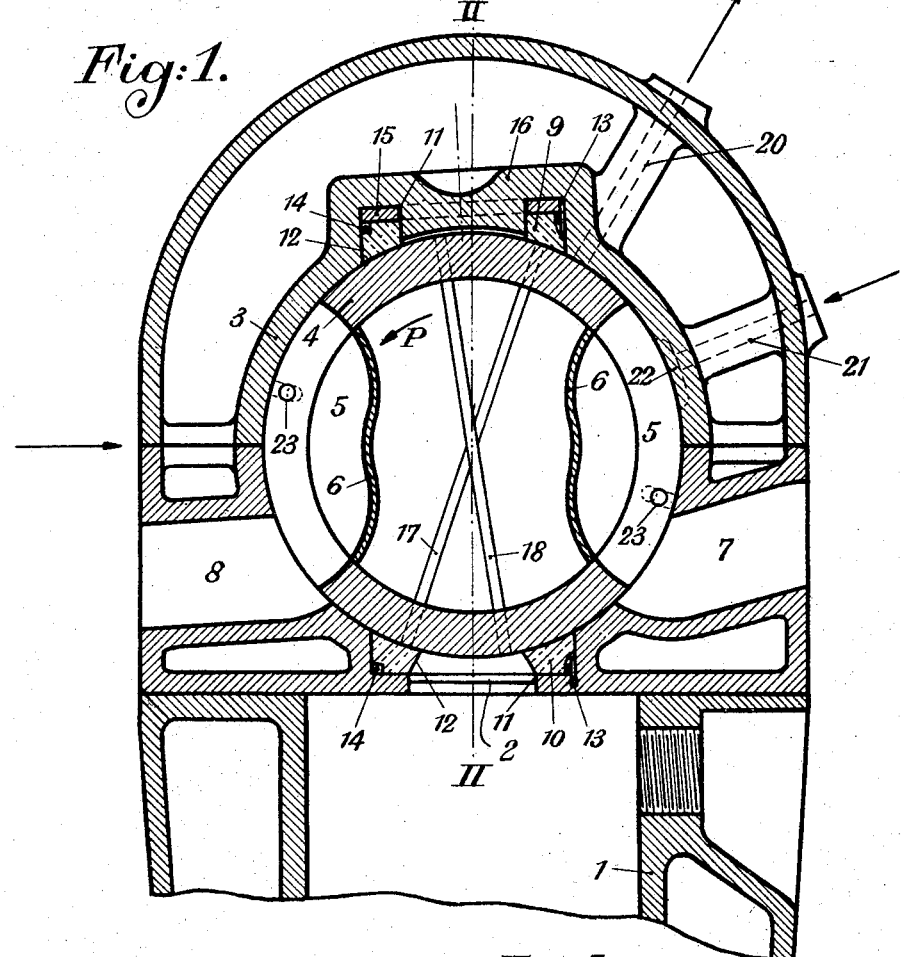
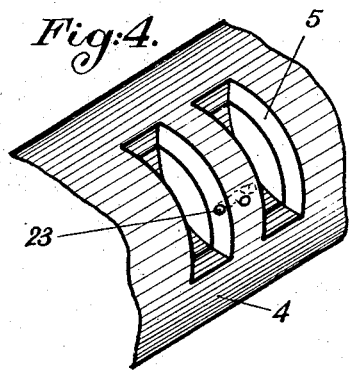
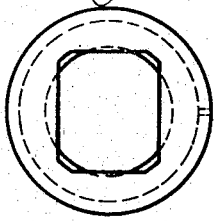
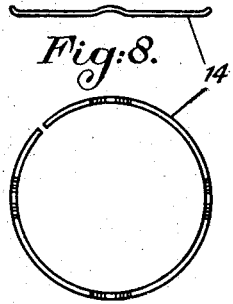
Inventor:
Jan Zeeman.
by Robert Cobb
Attorneys July 19, 1932. J. ZEEMAN 1,868,301
INTERNAL COMBUSTION ENGINE
Filed Dec. 17, 1929   2 Sheets-Sheet 2

Inventor:
Jan Zeeman.
by Potter & Potter
Attorneys

Patented July 19, 1932

1,868,301

UNITED STATES PATENT OFFICE

JAN ZEEMAN, OF AMSTERDAM, NETHERLANDS

INTERNAL COMBUSTION ENGINE

Application filed December 17, 1929. Serial No. 414,735.

The invention relates to a four-stroke cycle internal combustion engine of the type whereby the control of the inlet, the compression, the expansion and the exhaust is effected by means of a rotating valve in the cylinder-head. The object of the invention is to improve such engine, to balance the gas pressure on the cylindrical valve; and to regain the explosive gas-mixture left in the valve-chambers after the inlet.

These improvements are shown by way of an example in the annexed drawings, in which the same numbers refer to the same parts.

Figure 1 is a vertical cross section of the cylinder-head with the rotating cylindrical valve.

Figure 4 is a perspective view of a part of the cylindrical valve.

Figures 5 and 6 show, respectively in vertical cross section and in plan view, a spring controlled packing piece.

Figures 7 and 8 show, respectively in side and in plan view, an annular spring, coacting with the packing ring.

Figure 2:
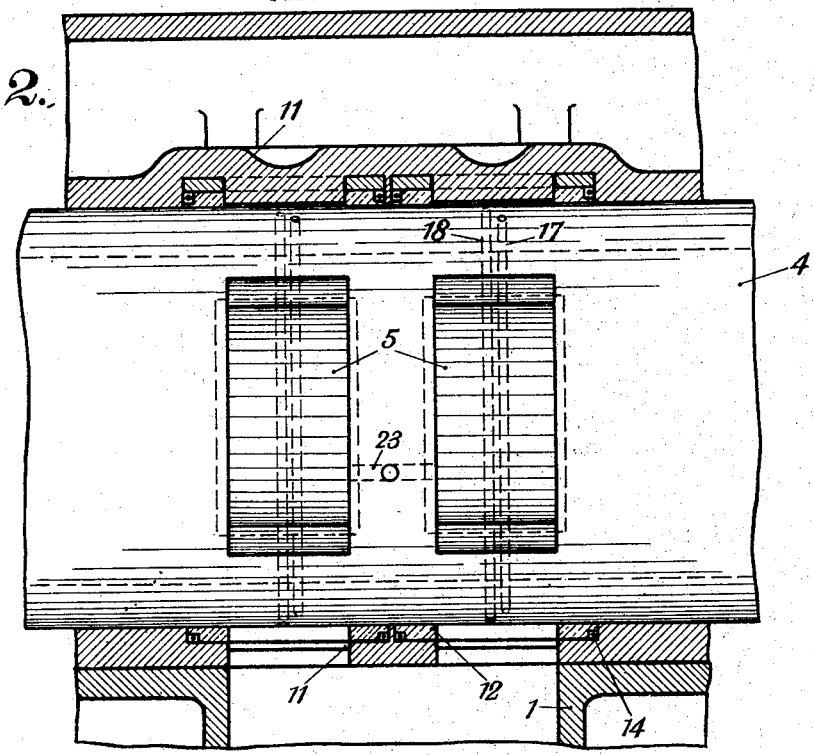
Figure 2 is a vertical longitudinal section of the cylinder-head, taken on the line II—II and looking in the direction of the arrow of Figure 1.

The working-cylinder 1 communicates by way of the port 2 with the cylindrical housing 3 in which the valve 4 fits and rotates. In this valve two chamberlike recesses or ports 5 are diametrically arranged and shaped by pressed copper walls 6 soldered or otherwise fixed in position. In the example the recesses 5 are, for reasons afterwards to be explained, constructed as double-chambers, so that the recesses 5 are arranged in pairs, whereby for each cylinder there are two ports each comprised of two recesses arranged in the valve-body. The valve 4 rotates in the direction of the arrow P at one quarter the speed of the crank shaft, so that the pairs of chambers 5, one after the other, will communicate respectively with the inlet port 7 and with the exhaust port 8. The valve-body is provided on the upper and lower or diametrically opposite sides with two upper spring packing pieces 9 and two lower spring packing pieces 10 which are arranged side by side to co-act with the pairs of chambers and to effect a gas tight joint with the cylindrical valve. Both the lower packing pieces 10 are arranged in the port 2 leading to the combustion chamber whilst both the upper packing pieces 9 are placed in a boss on the wall of the cylindrical housing 3 in which the valve 4 rotates. The bronze packing pieces 9 and 10 (see Figs. 5-8) consist of a ring part 12 and a very thin flange 11. Rotation of the rings 12 is prevented by means of small pins 13, but the rings are free to move in an axial direction to enable them to be pressed against the valve 4 by a spring ring 14 which is bulged out at four places to give the necessary spring pressure in the axial direction. During the compression-, explosion- and expansion period the lower packing pieces 10 are both pressed upwards against the valve-body 4 by the gas-pressure in the working-cylinder 1, assisted by the permanent pressure of the spring-ring 14, whilst the very thin flange 11 is expanded by the gas-pressure whereby in all directions an efficacious closing of the port 2 is obtained.

The two upper packing-pieces 9, arranged side by side, are both constructed similar to the packing-pieces 10, however with the difference, that their bores are circular whereas the bores of the packing-pieces 10 are rectangular shaped. The bores are however equal in area for the purpose of balancing the valve-body. As it is very difficult to form in the metal the necessary very narrow annular groove for the upwardly directed flange 11 of the upper packing-pieces 9, the ring 15 is made separate and the difference between the inner diameter of this ring 15 and the outer diameter of the core-piece 16 is about twice the thickness of the wall of the flange 11. The latter however must be able to move freely in an axial direction.

For the purpose of balancing the cylindrical valve 4 during the compression-, explosion- and expansion periods, small communicating tubes 17 and 18 are arranged such that diametrically opposite points of the circumference of the valve are connected to each other.

As illustrated they are shown of increased diameter for the sake of clearness, as the inner diameter is a little smaller than 1.5 mm. With two tubes for each packing piece, thus four per cylinder, it is ensured that the cylindrical valve is balanced during 224° rotation of the crank-shaft, that is during 89° compression and 135° explosion and expansion. The depth of the pressure-space between the cylindrical valve and the core 16 is hereby only about 0.3 mm. (drawn on an enlarged scale in the drawings), so that the amount of gas used for causing the balance-pressure, is so small as to be negligible. The balancing effect ceases at the beginning of the exhaust-period.

In contradistinction to the usual valve-devices which, in view of the large gas tight joint surface, and the length of the valve-body to be made gas tight, prevents the obtaining of a good supporting surface, the packing pieces, in accordance with the invention are self-adjusting and effect by their small dimensions a good bearing and gas tight fit against the valve-body. For this reason there are made for each cylinder, instead of one large packing piece, two small ones corresponding with the pair of chambers arranged side by side in the valve 4, because two small insert-pieces will give a better adjustment and gas tight fit than only large packing-piece.

Because the valve-body in consequence of the higher temperature will expand more than the cylindrical housing 3, there must always be a little play between them, which play moreover will enlarge with the wear and tear. Without the self adjusting and self tightening packing pieces it would be found that at the underside of the valve-body 4 a larger surface would be subjected to an unbalanced pressure, and leakage of the valve would result. By this invention the valve-body is subjected to a similar pressure on the cylinder port side and the side diametrically opposite.

Figure 3:
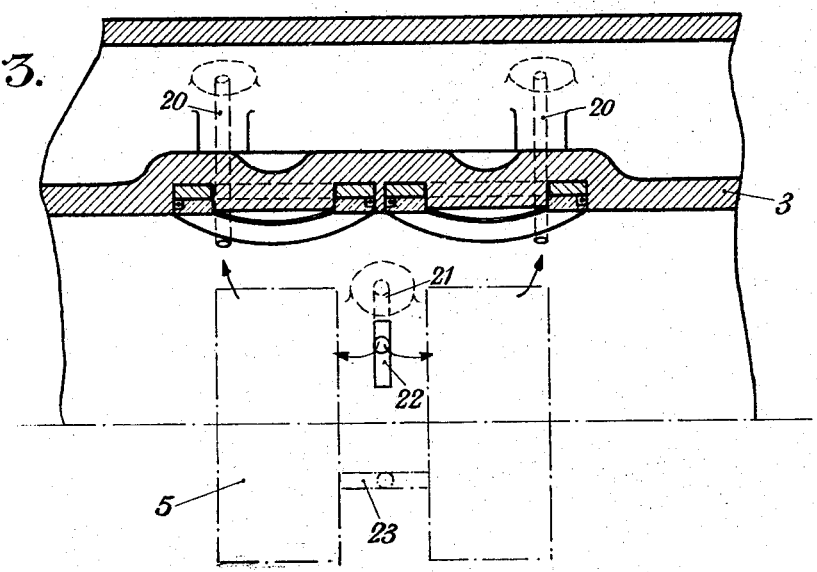
Figure 3 is a similar view to Figure 2, showing the upper portion of the cylinder-head and with the cylindrical valve removed.

For regaining the gas-mixture remaining in the valve-chambers 5 after the inlet period, the passages 20 and 21 are provided. The passage 21 communicates on the one side by way of an oblong slot 22, with the cylindrical housing 3, in which the valve 4 rotates, and on the other side with the open air. The passage 20 communicates on the one side with the housing 3 and on the other side with the inlet-pipe immediately behind the carburetor. These passages 20 are duplicated (see Fig. 3), so that one set is provided for each chamber 5 of the pair (dash-point lines in Fig. 3). The valve chambers have lateral passages 23 (see particularly Fig. 4), which during the rotating of the cylindrical valve, at the moment that the valve-chambers 5 are closed from the inlet communicate with the oblong openings 22. As at this moment the chambers 5 themselves communicate with the openings 20 which communicate with the inlet pipe and the explosive gas mixture residue contained in the chambers 5, will be sucked back to the inlet pipe.

The invention having been set forth, what is claimed as new and useful is:

1. An internal combustion engine comprising a rotary valve, a housing in the cylinder head in which the valve rotates, ports in the valve each of which comprises two chambers arranged side by side, two packing rings mounted to have an axial movement under the gas pressure in the said housing at the end of the port leading to the combustion chamber, and two packing rings mounted in the housing on the diametrically opposite side of the valve, means for transmitting the gas pressure from the cylinder to act on the latter packing rings, so that both sets of rings are pressed by gas pressure against the valve, and springs normally pressing the packing pieces towards the valve.

2. An internal combustion engine, comprising a rotary valve, a housing in the cylinder head in which the valve rotates, ports in the valve each of which comprises two chambers arranged side by side, two packing rings mounted to have an axial movement under the gas pressure in the said housing at the end of the port leading to the combustion chamber, and two packing rings mounted in the housing on the diametrically opposite side of the valve, two pipes in respect of each last mentioned packing ring passing diametrically through the valve and transmitting gas pressure from the cylinder to a space inside the packing ring, so that both sets of rings are pressed by gas pressure against the valve, and springs normally pressing the packing pieces towards the valve.

3. An internal combustion engine, comprising a rotary valve, a housing in the cylinder head in which the valve rotates, ports in the valve, each of which comprises two chambers arranged side by side, two packing rings mounted to have an axial movement, in the said housing at the end of the port leading to the combustion chamber, under gas pressure, and two packing rings mounted in the housing on the diametrically opposite side of the valve, thin flanges on the packing rings which are expanded by gas pressure to form a gas tight joint, two pipes in respect of each last mentioned packing ring passing diametrically through the valve and transmitting gas pressure from the cylinder to a space inside the packing ring, so that both sets of rings are pressed by gas pressure against the valve, and springs normally pressing the packing pieces towards the valve.

4. An internal combustion engine comprising a rotary valve, a housing in the cylinder head in which the valve rotates, ports in the valve, an axial movable packing ring mounted in the housing at the end of the port leading to the combustion chamber, an axially movable packing ring mounted in the housing on the opposite side of the chamber, means for transmitting the gas pressure from the cylinder to act on the latter packing ring so that both rings are pressed by gas pressure against the valve, and springs normally pressing the packing rings towards the valve.

JAN ZEEMAN.